(12) United States Patent
Hao et al.

(10) Patent No.: US 12,274,395 B1
(45) Date of Patent: Apr. 15, 2025

(54) GRILLING ASSEMBLY, STOVE AND COOKING DEVICE

(71) Applicant: Xiaoyan Hao, Hebei (CN)

(72) Inventors: Xiaoyan Hao, Hebei (CN); Yiming Zhang, Hebei (CN); Yundi Zhang, Hebei (CN); Chengche Liu, Hebei (CN)

(73) Assignee: Xiaoyan Hao, Shijiazhuang (CN)

( * ) Notice: Subject to any disclaimer, the term of this patent is extended or adjusted under 35 U.S.C. 154(b) by 0 days.

(21) Appl. No.: 18/909,996

(22) Filed: Oct. 9, 2024

(51) Int. Cl.
*A47J 37/07* (2006.01)
*A47J 36/06* (2006.01)
*A47J 37/10* (2006.01)

(52) U.S. Cl.
CPC ....... *A47J 37/0704* (2013.01); *A47J 37/0786* (2013.01); *A47J 37/10* (2013.01); *A47J 36/064* (2022.01)

(58) Field of Classification Search
CPC .... A47J 37/0704; A47J 37/0786; A47J 37/10; A47J 36/064
See application file for complete search history.

(56) References Cited

U.S. PATENT DOCUMENTS

| 484,482 | A | * | 10/1892 | Wheeler | A47J 37/06 |
| | | | | | 99/422 |
| 1,510,030 | A | * | 9/1924 | Baldwin | F24C 15/10 |
| | | | | | 126/215 |
| 1,732,554 | A | * | 10/1929 | Detwiler | A47J 36/36 |
| | | | | | 99/422 |
| 2,061,610 | A | * | 11/1936 | Burnette | A47J 37/10 |
| | | | | | 99/425 |
| 4,539,973 | A | * | 9/1985 | Hait | A47J 37/0763 |
| | | | | | 126/43 |
| 4,930,491 | A | * | 6/1990 | Purello | A47J 37/067 |
| | | | | | 126/41 R |
| 11,974,576 | B2 | | 5/2024 | Raio et al. | |
| 2011/0315135 | A1 | * | 12/2011 | Hillard | A47J 37/0623 |
| | | | | | 126/39 C |
| 2012/0192724 | A1 | * | 8/2012 | Harrison | A47J 45/10 |
| | | | | | 294/104 |
| 2014/0251160 | A1 | | 9/2014 | Contarino, Jr. | |
| 2017/0013999 | A1 | * | 1/2017 | Horsfield | A47J 37/0763 |
| 2017/0172158 | A1 | * | 6/2017 | Lipinski | A47J 37/0704 |
| 2021/0018180 | A1 | * | 1/2021 | Jan | F24B 1/192 |
| 2021/0156565 | A1 | * | 5/2021 | Skillman | F24B 3/00 |
| 2022/0015569 | A1 | * | 1/2022 | Stohl | A47J 37/103 |
| 2022/0133086 | A1 | | 5/2022 | Elliott | |
| 2022/0279965 | A1 | * | 9/2022 | Barry | A47J 37/0786 |
| 2023/0071035 | A1 | | 5/2023 | Orebaugh | |

FOREIGN PATENT DOCUMENTS

| DE | 10236945 | A1 | * | 3/2004 | ............. F24B 1/202 |
| JP | 2006102488 | A | * | 4/2006 | |
| KR | 102485585 | B1 | * | 1/2023 | |

* cited by examiner

*Primary Examiner* — Michael G Hoang
*Assistant Examiner* — Logan P Jones
(74) *Attorney, Agent, or Firm* — S.J. Intellectual Property LTD.

(57) ABSTRACT

A grilling assembly includes a grilling pan, which includes a grilling area and a heat penetration area arranged outside the grilling area. At least one through hole is arranged in the heat penetration area. The at least one through hole is configured to allow at least a portion of heat to pass through to the grilling area.

14 Claims, 19 Drawing Sheets

GRILLING ASSEMBLY, STOVE AND COOKING DEVICE

TECHNICAL FIELD

The present disclosure relates to the technical field of cooking devices, and in particular, to a grilling assembly and a stove.

BACKGROUND

Frying and grilling are common cooking ways used by people. Food can be cooked through heat radiation or heat conduction during the frying or grilling process.

SUMMARY

A first aspect of the embodiments of the present disclosure provides a grilling assembly, which includes a grilling pan. The grilling pan includes a grilling area and a heat penetration area arranged outside the grilling area. The heat penetration area is defined with at least one through hole, the at least one through hole is configured to allow at least a portion of heat to pass through and be transferred to the grilling area.

A second aspect of the embodiments of the present disclosure provides a stove, which includes a stove chamber enclosed by a stove wall. A grate plate is arranged in the stove chamber, and the grate plate divides the stove chamber into an upper stove chamber and a lower stove chamber. The stove wall includes an outer stove wall and an inner stove wall, an air passage for gas flow is defined between the outer stove wall and the inner stove wall, and a bottom of the air passage is in communication with the lower stove chamber. A lower portion of the outer stove wall is defined with an outer air inlet hole, and the outer air inlet hole is in communication with the lower stove chamber. An upper portion of the inner stove wall is provided with an inner air inlet hole, and the air passage is in communication with the upper stove chamber through the inner air inlet hole. Combustion-supporting air entering the lower stove chamber from the outer air inlet hole is divided into at least two portions, one portion of the combustion-supporting air is capable of entering the upper stove chamber through a grate hole of the grate plate; another portion of the combustion-supporting air is capable of entering the upper stove chamber through the air passage.

A third aspect of the embodiments of the present disclosure provides a cooking device, which includes a stove and a grilling assembly mounted on a top of the stove. The stove includes a stove chamber enclosed by a stove wall, a grate plate is arranged in the stove chamber, and the grate plate divides the stove chamber into an upper stove chamber and a lower stove chamber. The stove wall includes an outer stove wall and an inner stove wall, an air passage for gas flow is defined between the outer stove wall and the inner stove wall, and a bottom of the air passage is in communication with the lower stove chamber. A lower portion of the outer stove wall is defined with an outer air inlet hole, and the outer air inlet hole is in communication with the lower stove chamber. An upper portion of the inner stove wall is provided with an inner air inlet hole, and the air passage is in communication with the upper stove chamber through the inner air inlet hole. Combustion-supporting air entering the lower stove chamber from the outer air inlet hole is divided into at least two portions, one portion of the combustion-supporting air is capable of entering the upper stove chamber through a grate hole of the grate plate; another portion of the combustion-supporting air is capable of entering the upper stove chamber through the air passage. The grilling assembly includes a grilling pan, the grilling pan includes a grilling area and a heat penetration area arranged outside the grilling area. The heat penetration area is defined with at least one through hole, the at least one through hole is configured to allow at least a portion of heat to pass through and be transferred to the grilling area.

BRIEF DESCRIPTION OF THE DRAWINGS

The description and drawings that constitute a part of the present disclosure are provided for a further understanding of the present disclosure. The illustrative embodiments and their descriptions are provided for explanation but do not constitute improper limitations on the present disclosure.

DETAILED WAY

Figure 1:
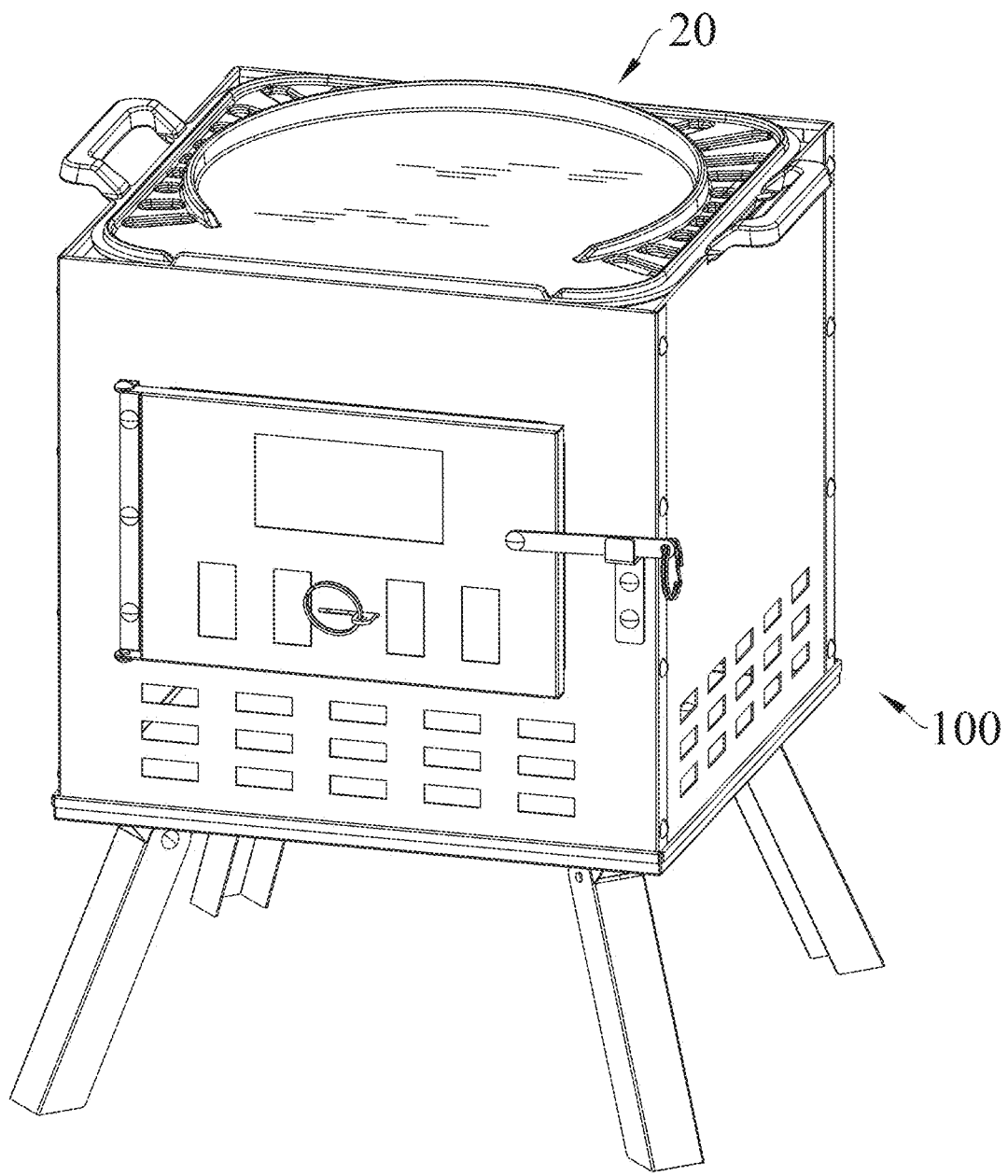
FIG. 1 is a schematic structural view of a cooking device according to some embodiments of the present disclosure.

The present disclosure may be described in detail below with reference to the accompanying drawings and in conjunction with various embodiments. Each example is provided to explain but not limit the present disclosure. In fact, it may be clear to those of ordinary skill that modifications and variations may be made without departing from the scope or spirit of the present disclosure. For example, a feature shown or described as part of one embodiment may be used according to another embodiment to produce yet another embodiment. Therefore, it is intended that the present disclosure includes such modifications and variations within the scope of the appended claims and their equivalents.

In the description of the present disclosure, the terms "longitudinal", "lateral", "upper", "lower", "front", "back", "left", "right", "vertical", "horizontal", "top", "bottom" and the like indicate the orientational or positional relationship based on the orientational or positional relationship illustrated in the drawings, which is only for the convenience of describing and does not require the present disclosure to be constructed and operated in a specific orientation, and therefore cannot be understood as limiting the present disclosure. The terms "connected", "connecting" and "arranged" used in the present disclosure should be understood in a broad sense. For example, it may be a fixed connection or a detachable connection; it may be directly connected or indirectly connected through an intermediate component; it may also be a wired electrical connection, a radio connection, or a wireless signal connection. For those of ordinary skill in the art, the specific meanings of the above terms may be understood according to the specific circumstances.

One or more examples of the present disclosure are illustrated in the attached drawings. Numbers and letter signs are used in the detailed description to refer to features in the drawings. Similar signs in the drawings and descriptions have been configured to refer to similar parts of the present disclosure. As used herein, the terms "first", "second" and "third" are used interchangeably to distinguish one component from another and are not intended to indicate the position or importance of individual components.

As shown in FIG. 1, according to an embodiment of the present disclosure, a cooking device is provided, including a stove 100 for providing heat and a grilling pan 20 placed on a top of the stove 100. Fuel can be filled into the stove 100 to provide heat required for frying and grilling. In the present embodiment, the fuel includes wood, charcoal, biomass fuel, etc.

Figure 2:
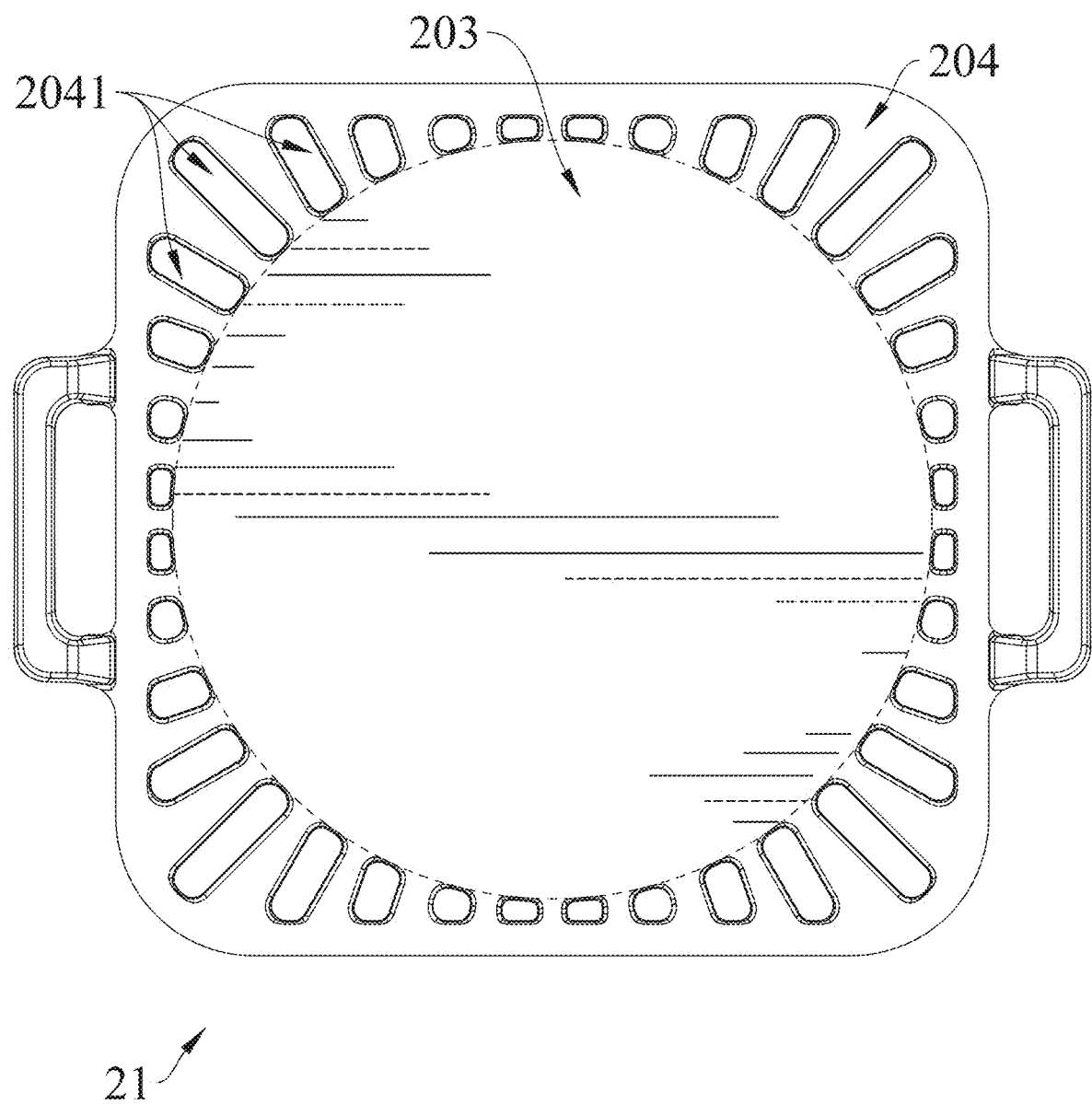
FIG. 2 is a schematic structural view of a grilling pan according to some embodiments of the present disclosure.

In some embodiments, as shown in FIG. 2, a main body of the grilling pan 21 is a flat plate, and the grilling pan 21 is arranged with a frying area 203 for placing and cooking food. The grilling pan 21 is arranged with a heat penetration area 204, which is arranged at a periphery of the frying area 203. The heat penetration area 204 is defined with a plurality of through holes 2041, and the plurality of through holes 2041 are distributed around the frying area 203. When the grilling pan 21 is placed on the top of the stove 100, some heat in the stove 100 can directly pass through some of the at least one through hole 2041 of the grilling pan 21, and that portion of heat is applied to the food. The type of the heat passing through the at least one through hole 2041 includes at least one of hot air flow and flame.

Figure 3:
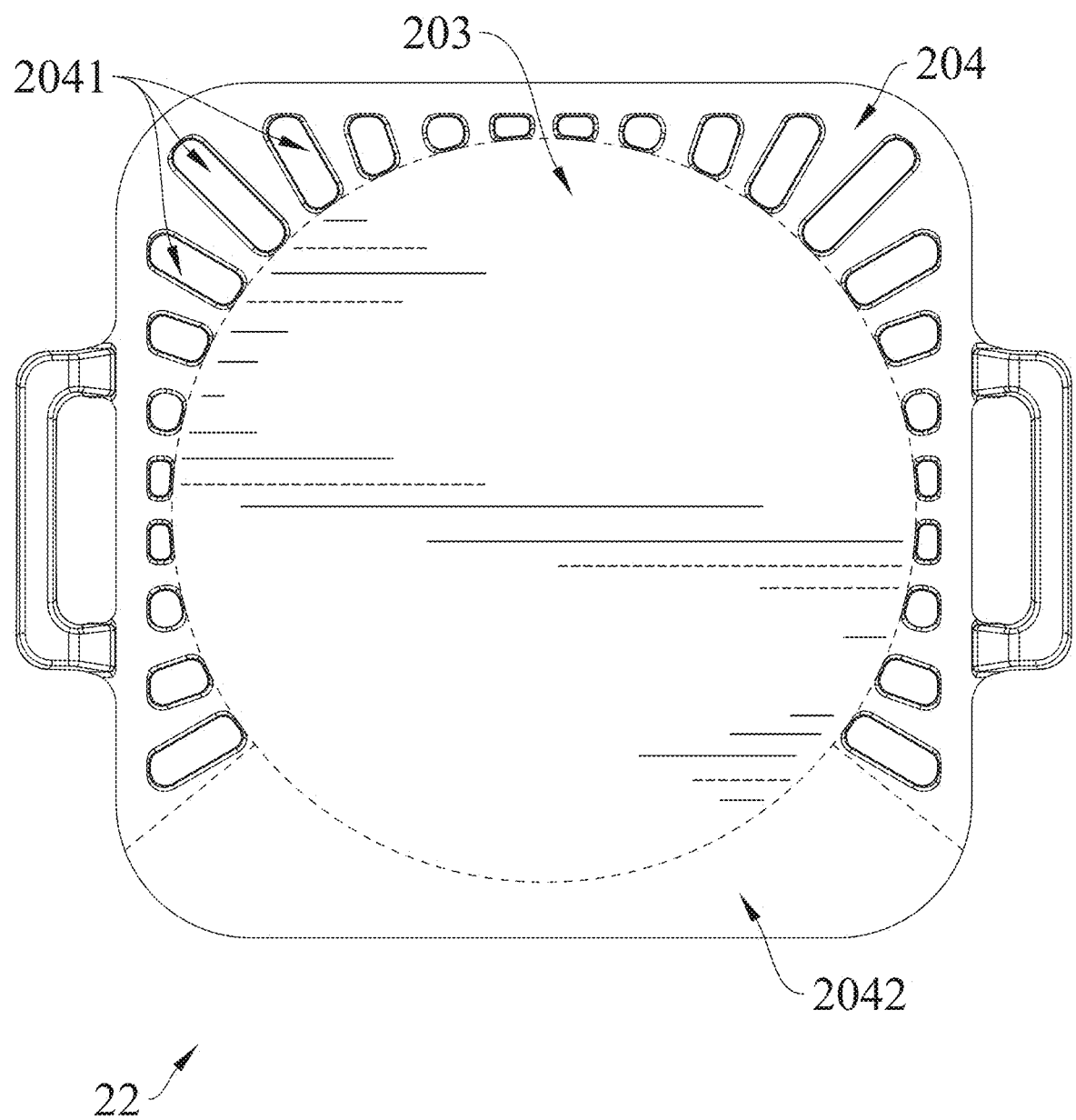
FIG. 3 is a schematic structural view of a grilling pan according to some embodiments of the present disclosure.

In some embodiments, as shown in FIG. 3, referring to the embodiment of the grilling pan 21 shown in FIG. 2, the heat penetration area 204 of the grilling pan 22 in the present embodiment is provided with an insulation area 2042, and no through hole 2041 is provided in the insulation area 2042. The insulation area 2042 is an operation area reserved for the cook, and the heat in the stove 100 may be weakened after being blocked by the insulation area 2042. When cooking food near the insulation area 2042, the cook may not be influenced at least by the portion of the heat passing through the at least one through hole 2041.

Figure 4:
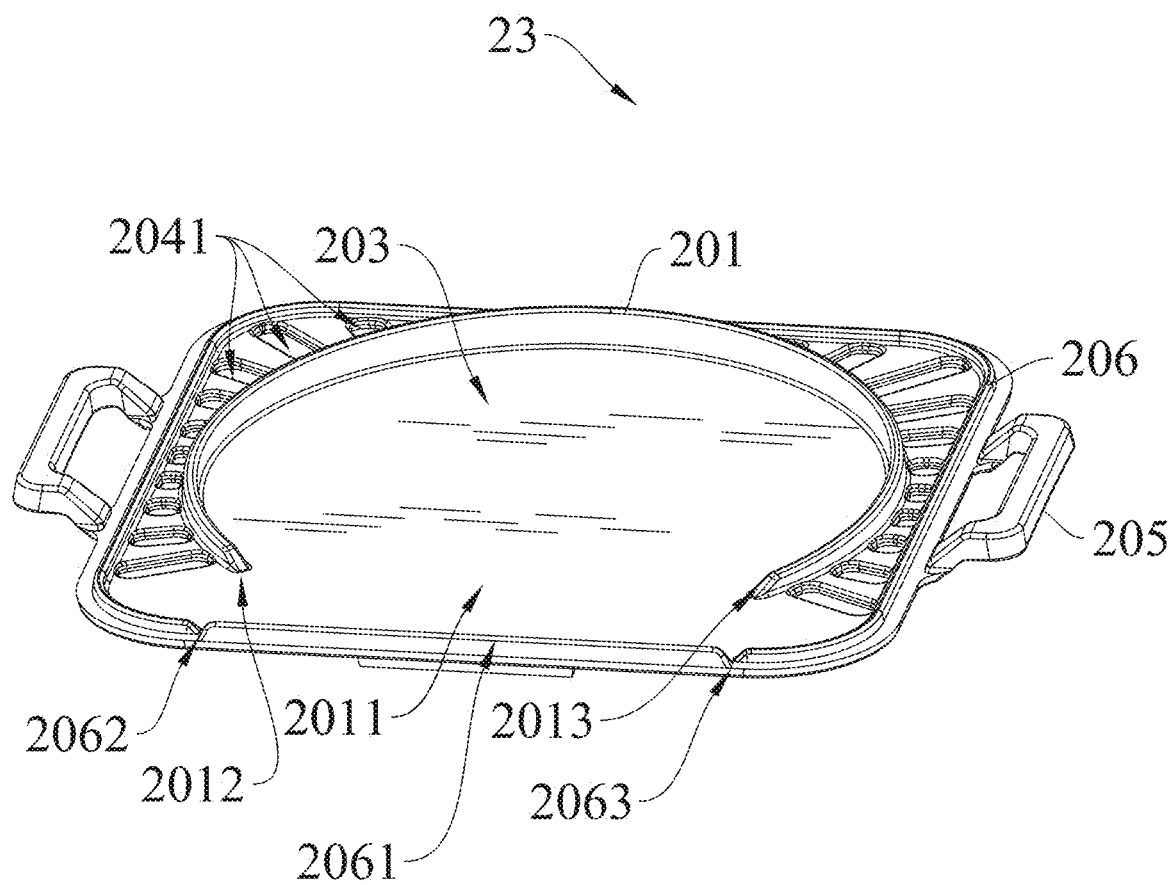
FIG. 4 is a schematic structural view of a grilling pan according to some embodiments of the present disclosure.

In some embodiments, as shown in FIG. 4, referring to the embodiment of the grilling pan 22 shown in FIG. 3, the grilling pan 23 is provided with an outwardly protruding annular enclosure 201 along an edge of the frying area 203. Different food materials have different requirements for heat. If some heat passing through the at least one through hole 2041 acts directly or is relatively close to the food materials, the nutrition or appearance of them may be destroyed. Therefore, for such food materials, the grilling pan 23 with the enclosure 201 can be selected, and some heat passing through the at least one through hole 2041 may be shielded by the enclosure 201, which can satisfy the heat requirement of the food materials without damaging them. In some embodiments, the grilling pan 23 shown in FIG. 4 is provided with an insulation area 2042, and the enclosure 201 is defined with a notch 2011 at the intersection of the frying area 203 and the insulation area 2042. The notch 2011 can be adapted to some kitchen utensils. For example, a spatula is required to bake pizza, and the notch 2011 facilitates the spatula to put the pizza into the frying area 203, or to take the baked pizza out of the frying area 203. In some embodiments, the enclosure 201 can also be arranged as a closed ring. The annular enclosure 201 includes a first bevel 2012 and a second bevel 2013, the first bevel 2012 and the second bevel 2013 of the annular enclosure 201 define the notch 2011 at the intersection of the grilling area 203 and the insulation area 2042. The intersection of the grilling area 203 and the insulation area 2042 extends from a longitudinal direction of the grilling pan 23.

In some embodiments, the grilling pan 20 in the above embodiments can be provided with a first handle 205. As shown in FIG. 4, two first handles 205 can be optionally provided, and the two first handles 205 are respectively provided on opposite sides of the grilling pan 23 and fixedly connected to the grilling pan 23. The temperature of the grilling pan 23 is high during cooking, but the temperature of the first handle 205 is relatively low, and it is relatively safer to transfer the grilling pan 23 by holding the first handle 205. The first handle 205 can also be covered with heat-insulating material, and the temperature of the first handle 205 may be lower.

In the above embodiment, the frying area 203 is circular. In some embodiments, the frying area 203 is also selected to be elliptical, rectangular, or other polygonal. The frying area 203 can be designed with a more suitable shape as needed, for example, a circle is suitable for making pizza, and a rectangle is suitable for frying meat.

Figure 5:
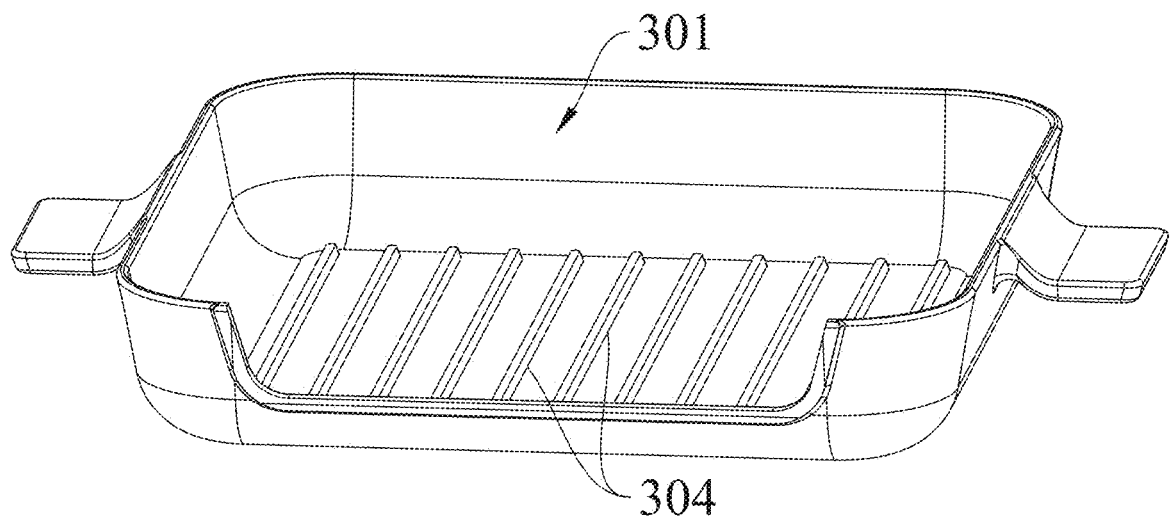
FIG. 5 is a schematic structural view of a frying pan according to some embodiments of the present disclosure.

As shown in FIG. 5, an embodiment of the present disclosure also provides a frying pan 300, which is provided with an inwardly concave chamber 301, and the frying pan 300 can be directly placed on the top of the stove 100 for use. In some embodiments, in order to facilitate the movement of the frying pan 300, the frying pan 300 is provided with two second handles 303, and the second handles 303 are fixedly connected to the frying pan 300.

In some embodiments, a bottom of the chamber 301 of the frying pan 300 is provided with a plurality of raised structures, which may be raised strips 304 or raised dots. The raised structures may reduce the direct contact area between the food and the frying pan 300 and may meet the cooking requirements of some type of food. In some embodiments, the raised structures are evenly arranged on the bottom of the chamber 301.

Figure 7:
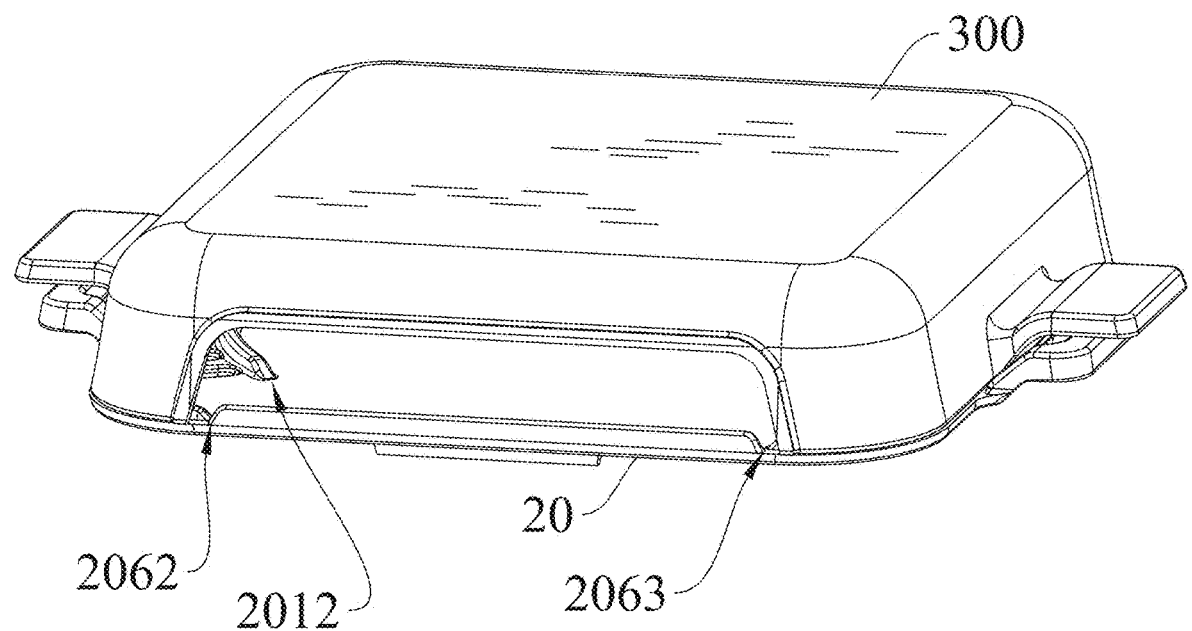
FIG. 7 is a schematic structural view of a grilling pan and a frying pan covered to each other according to some embodiments of the present disclosure.
Figure 8:
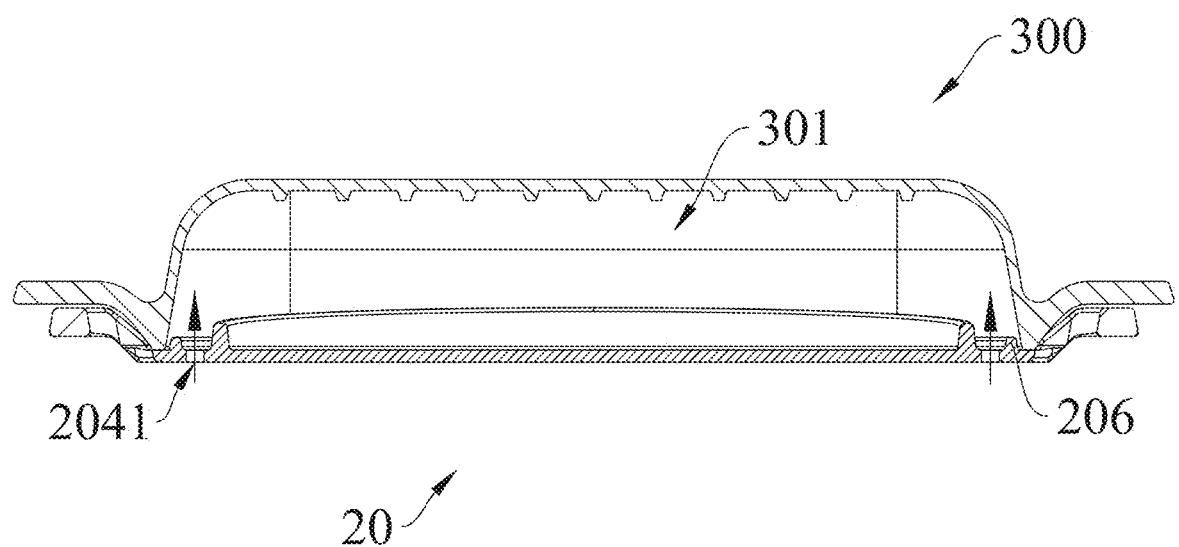
FIG. 8 is a cross-sectional view of FIG. 7.

In some embodiments, as shown in FIG. 7, the frying pan 300 may be selectively covered on a top of the grilling pan 20 and served as a cover of the grilling pan 20. In the present embodiment, one of the functions of the frying pan 300 is to provide a baking space. As shown in FIG. 8, the frying pan 300 may completely cover the heat penetration area 204 and the frying area 203, and some heat in the stove 100 may pass through the at least one through hole 2041 from the bottom of the grilling pan 20 and directly enter the chamber 301 of the frying pan 300 in the direction shown by the arrow in FIG. 8. The frying pan 300 collects the heat in the chamber 301, and the heat may cover the top of the frying area 203, providing more heat for cooking the food. Meanwhile, the bottom of the food can obtain heat through the grilling pan 20, such that the food is heated more thoroughly to meet the cooking requirements of some food.

In some embodiments, as shown in FIG. 4, FIG. 7 and FIG. 8, the grilling pan 20 is provided with a convex ridge 206 protruding outward along an outer edge of the heat penetration area 204. The convex ridge 206 can be a plurality of columnar structures or strip structures distributed on the outer edge of the heat penetration area 204. Alternatively, the convex ridge 206 can also be a closed ring structure formed along the outer edge of the heat penetration area 204. When the frying pan 300 is combined with the grilling pan 20, an inner wall of the edge of the frying pan 300 and an outer wall of the convex ridge 206 are mutually engaged, such that the frying pan 300 is more stable after being combined with the grilling pan 20. A first portion 2061 of the convex ridge 206 is defined with a first indentation 2062 and a second indentation 2063 facing the notch 2011 of the annular enclosure 201. The first portion 2061 of the convex ridge 206 is arranged on an outer edge of the insulation area 2042 and extends from the longitudinal direction of the grilling pan 23.

Figure 6:
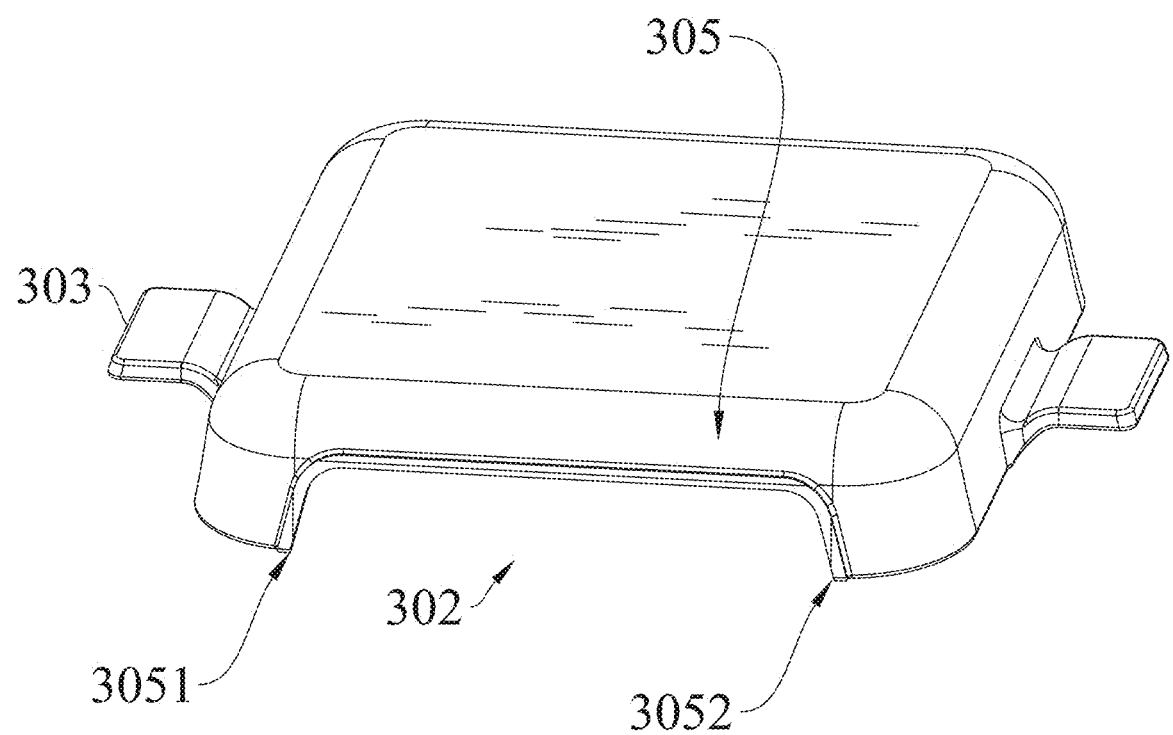
FIG. 6 is a schematic structural view of the frying pan upside down shown in FIG. 5.

In some embodiments, as shown in FIG. 6 and FIG. 7, a concaved wall 305 of the frying pan 300 can also be provided with an opening 302, through which the state of the food can be observed. A distance from a first end point 3051 to a second end point 3052 of the concaved wall 305 of the frying pan 300 is greater than a distance between the first indentation 2062 and the second indentation 2063. When the frying pan 300 and the grilling pan 20 are in a closed position, the first indentation 2062 and the second indentation 2063 are located between the first end point 3051 and the second end point 3052 of the concaved wall 305 of the frying pan 300.

Figure 9:
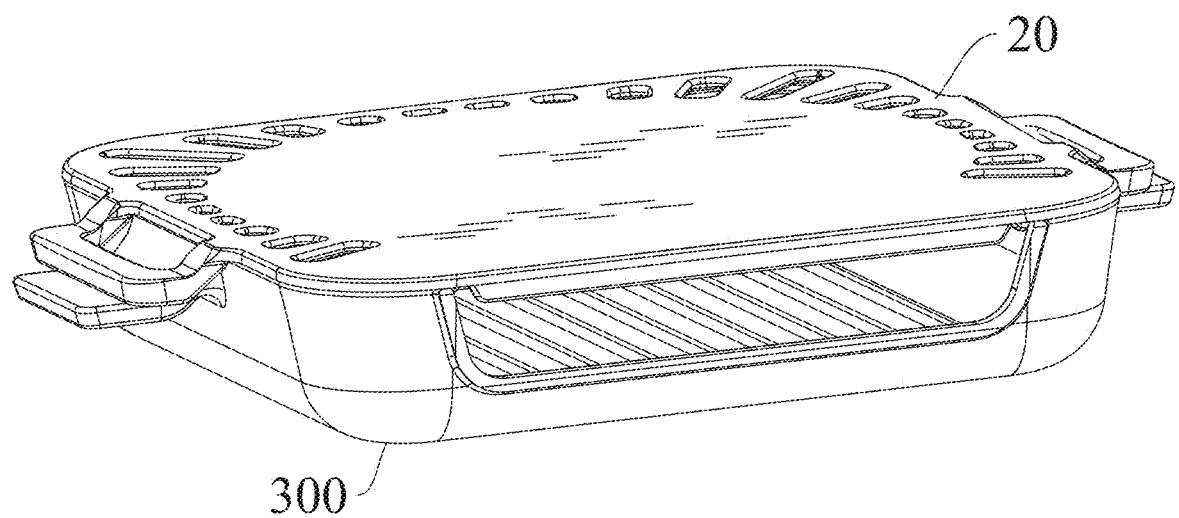
FIG. 9 is another schematic structural view of a grilling pan and a frying pan covered to each other according to some embodiments of the present disclosure.

As shown in FIG. 9, in some embodiments, when the frying pan 300 is used to directly cook the food, the grilling pan 20 can be selectively covered on the top of the frying pan 300 and served as a cover of the frying pan 300.

The grilling pan 20 and the frying pan 300 can be used as grilling components on the stove 100, an electric stove or a stove that can provide heat. The grilling component can selectively include at least one of the grilling pan 20 and the frying pan 300, and the way of using the grilling pan 20 and the frying pan 300 can be selected as needed.

The embodiments of the present disclosure also provide a stove 100, which can provide heat for the grilling component and can be served as one of the cooking settings of the grilling component.

The stove 100 includes a stove chamber 101, which is surrounded by at least three stove walls. A grate plate 102 is provided in the stove chamber 101, and the grate plate 102 divides the stove chamber 101 into an upper stove chamber 1011 and a lower stove chamber 1012. The upper stove chamber 1011 is a combustion chamber, and the lower stove chamber 1012 is a residue chamber. Wood or charcoal or fuel of the same nature can be placed in the combustion chamber, and the residue after the fuel is burned may fall into the residue chamber through the grate holes 1021 of the grate plate 102. The above-mentioned grilling assembly is placed above the combustion chamber to cook the food.

Figure 10:
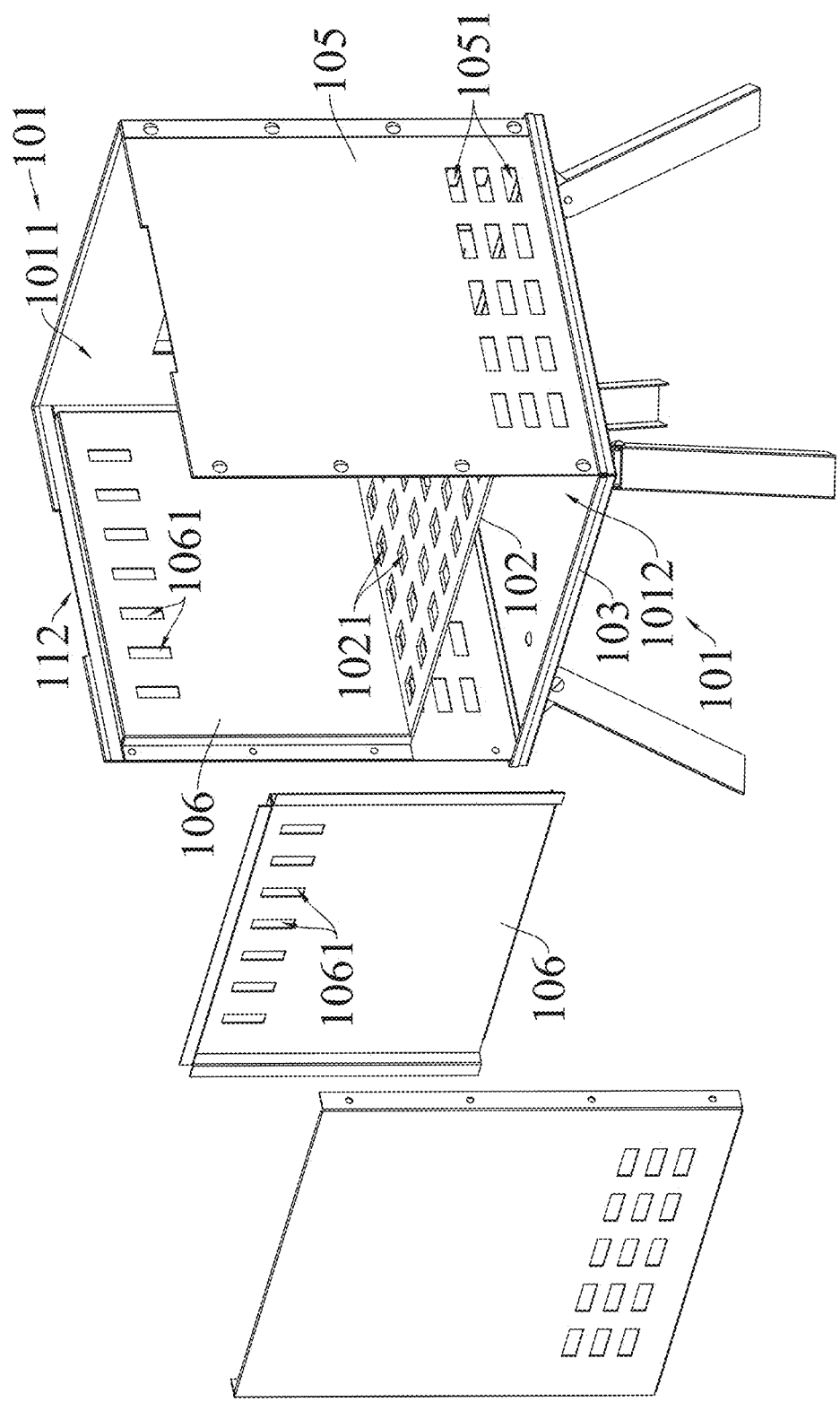
FIG. 10 is a schematic structural view of a stove and a stove wall.
Figure 11:
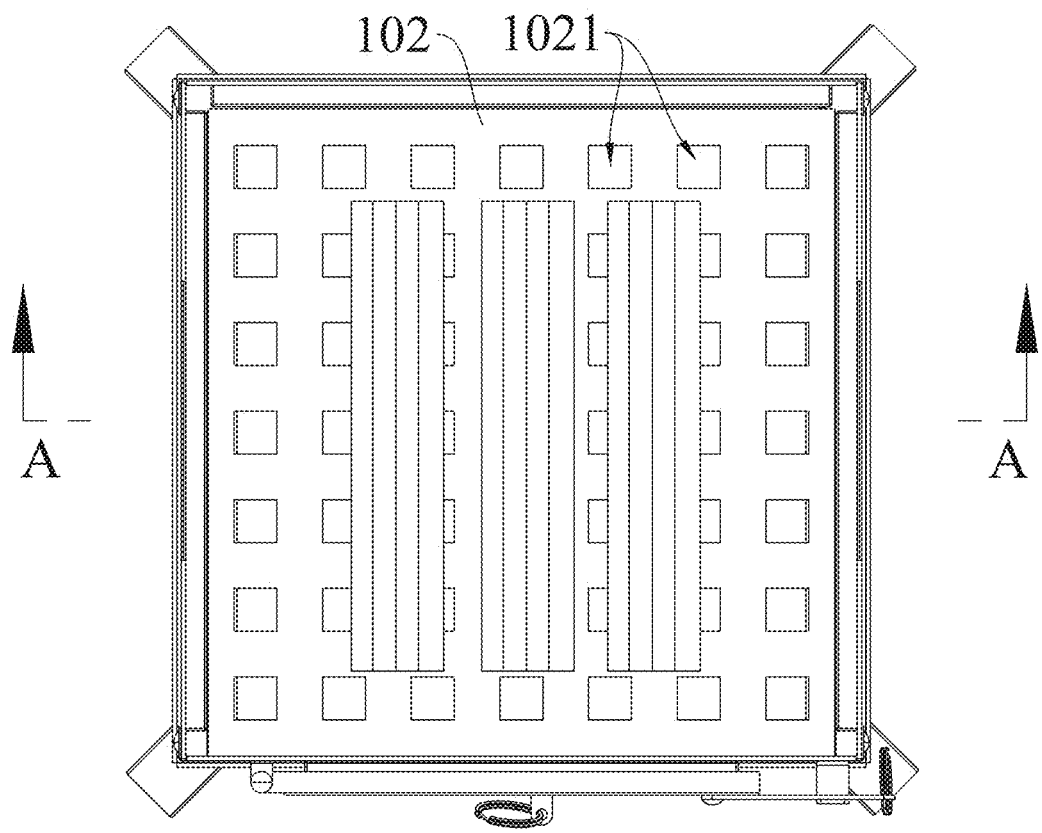
FIG. 11 is a perspective view of a stove according to some embodiments of the present disclosure.
Figure 12:
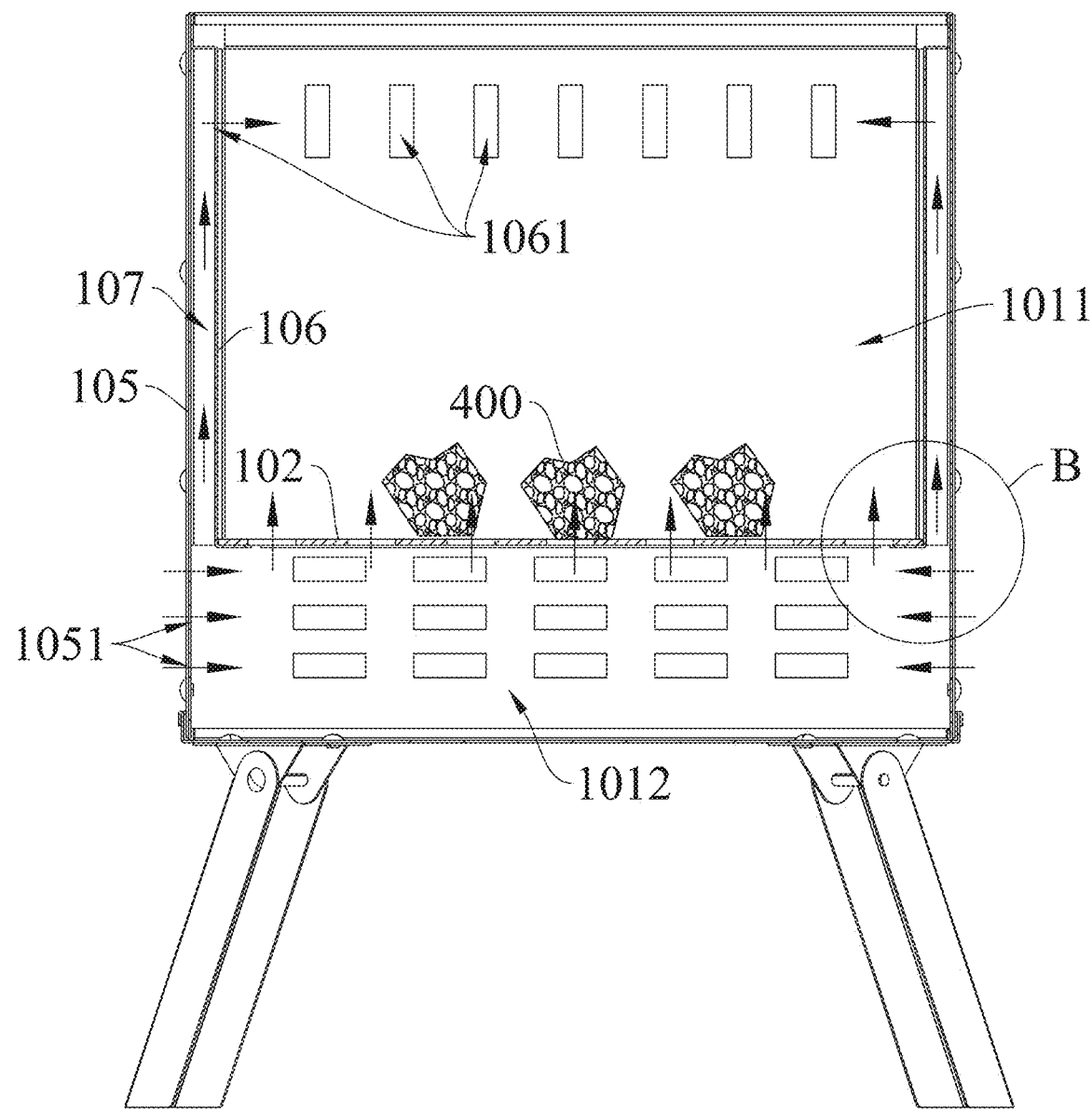
FIG. 12 is a cross-sectional view of the stove shown in FIG. 11 along the AA direction.
Figure 13:
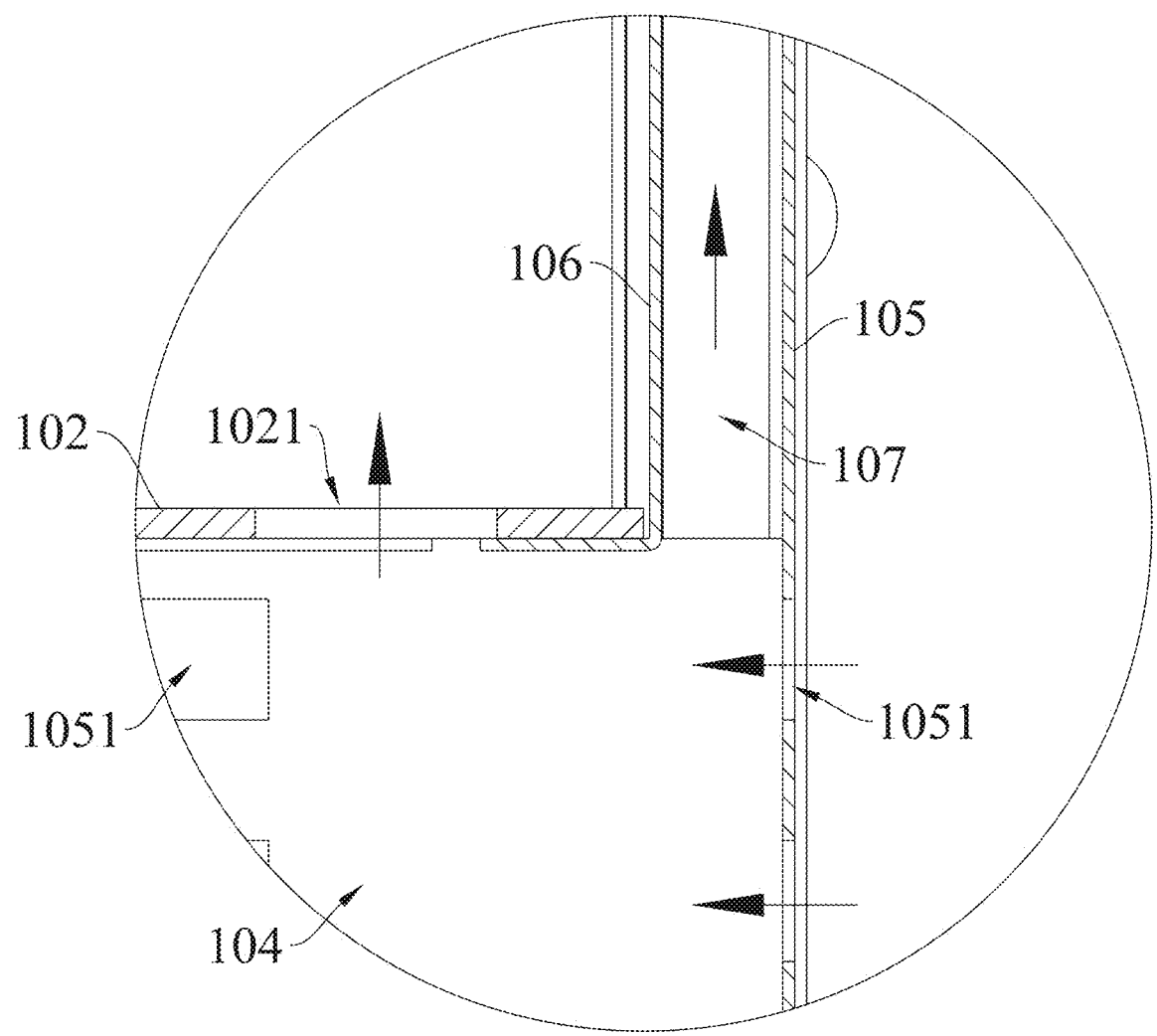
FIG. 13 is an enlarged view of part B in FIG. 12.

In some embodiments, as shown in FIG. 10, four stove walls surround together to form the stove chamber 101, and each stove wall includes an outer stove wall 105 and an inner stove wall 106. Referring to FIG. 12 and FIG. 13, an air passage 107 for gas flow is defined between the outer stove wall 105 and the inner stove wall 106. A lower portion of the outer stove wall 105 is defined with an outer air inlet 1051, and the outer air inlet 1051 is in communication with the lower stove chamber 1012. An upper portion of the inner stove wall 106 is defined with an inner air inlet 1061, and the inner air inlet 1061 is in communication with the upper stove chamber 1011. The air outside the stove 100 can enter the lower stove chamber 1012 from the outer air inlet 1051, and the air entering the lower stove chamber 1012 may be divided into two portions. The first portion of the air can enter the upper stove chamber 1011 from the grate hole 1021 of the grate plate 102. This portion of the air is the main air source for the combustion of the charcoal block 400; the second portion of the air can flow along the air passage 107 to the top of the inner stove wall 106 and enter the upper stove chamber 1011 from the inner air inlet 1061, so as to achieve the purpose of secondary air intake and combustion.

In some embodiments, as shown in FIG. 1 and FIG. 10, each top of the two opposite stove walls is defined with a notch 112. When the grilling pan 20 or the frying pan 300 is placed on the stove 100 for cooking, the first handle 205 of the grilling pan 20 or the second handle 303 of the frying pan 300 may fall into the notch 112 and engage with the notch 112. In this case, the horizontal displacement of the grilling pan 20 or the frying pan 300 may be limited.

Figure 14:
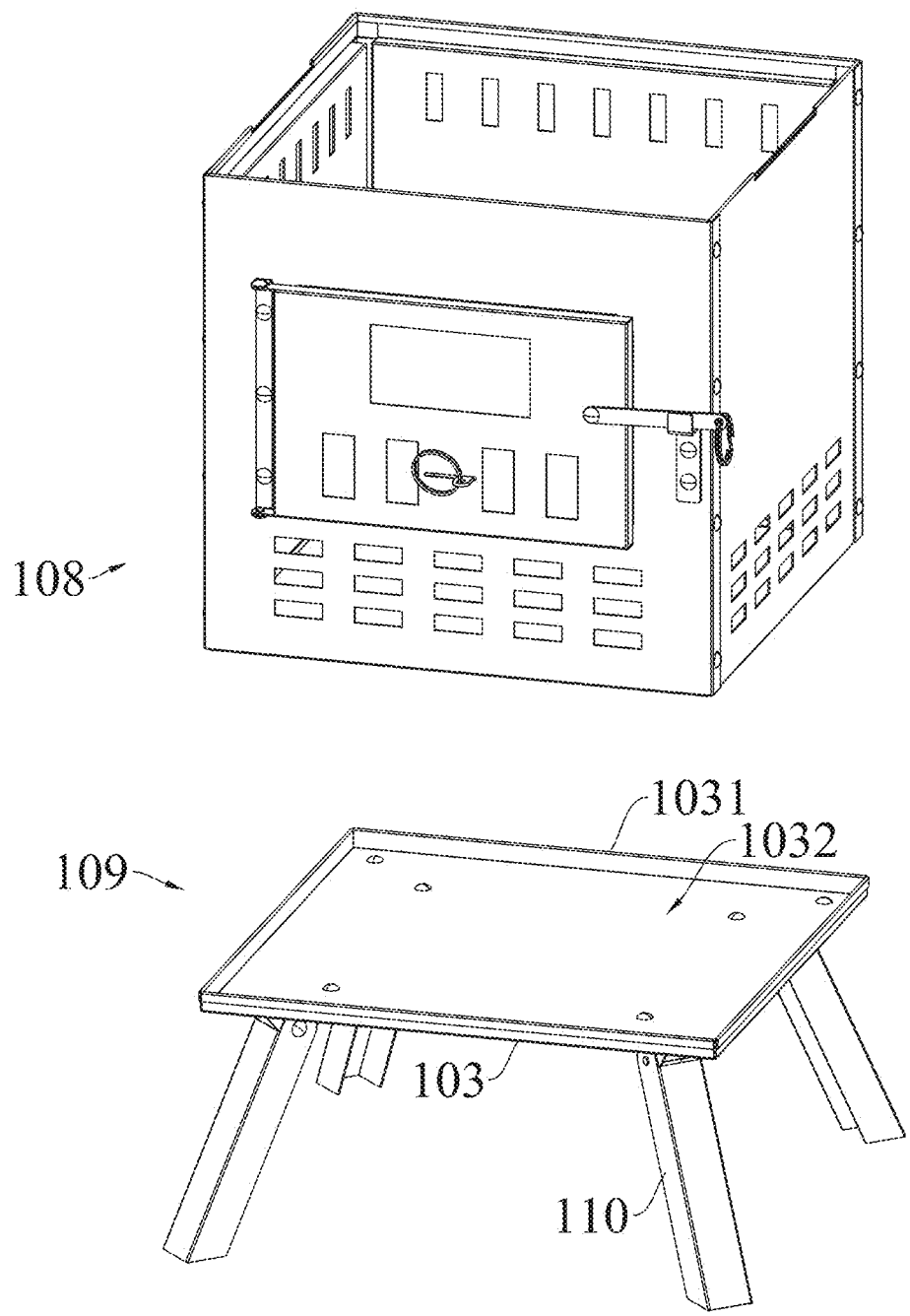
FIG. 14 is a schematic structural view of a stove body and a base separated with each other according to some embodiments of the present disclosure.

In some embodiments, as shown in FIG. 14, the stove 100 includes a stove body 108 and a base 109 detachably connected to each other, the stove body 108 includes a stove wall and a stove chamber 101 formed by the stove wall, the base 109 includes a bottom plate 103 for holding the stove body 108, and the stove body 108 can be selectively placed above the bottom plate 103. During the cooking process, the residue after the fuel is burned may fall onto the bottom plate 103. When the residue needs to be cleaned, the stove body 108 can be lifted, and then the residue on the bottom plate 103 can be cleaned.

In some embodiments, as shown in FIG. 14, an edge of the bottom plate 103 is provided with an upward flange 1031, the flange 1031 and the bottom plate 103 form a trough 1032, and the stove body 108 can be placed in the trough 1032. The trough 1032 can not only limit the displacement of the stove body 108, but also facilitate the collection of the residue after the fuel is burned.

Figure 15:
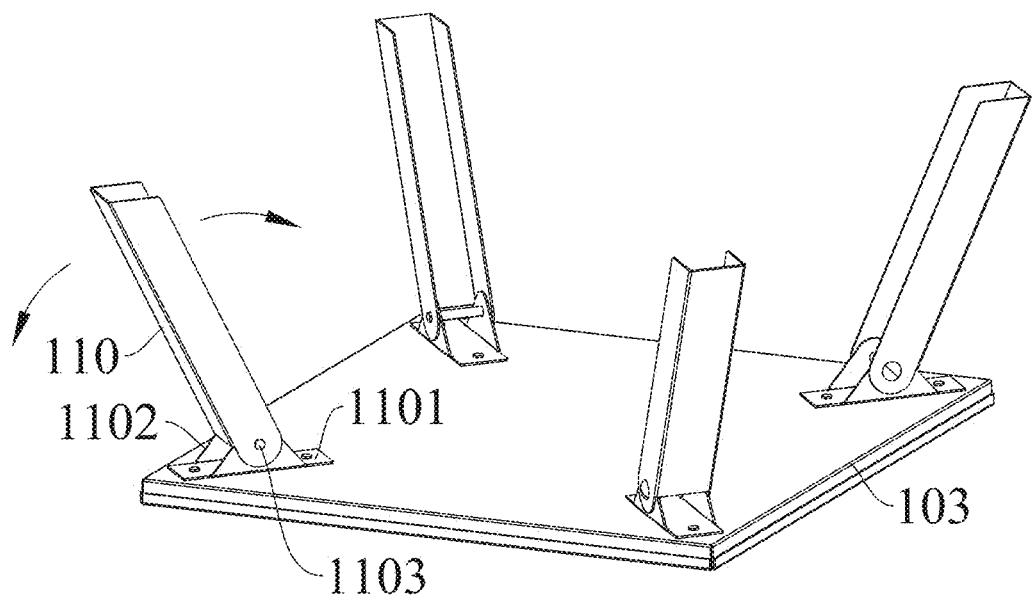
FIG. 15 is a schematic structural view of a base according to some embodiments of the present disclosure.

In some embodiments, as shown in FIG. 14 and FIG. 15, four feet 110 are installed under the bottom plate 103, and the feet 110 can be selectively folded or erected. In the present embodiment, a hinge seat 1101 is installed on the bottom plate 103, and the hinge seat 1101 is provided with a connecting plate 1102, and the foot 110 and the connecting plate 1102 are rotatably connected through a pin 1103. The upright state of the feet 110 can meet the height required by the stove 100 during cooking; the folded state of the feet 110 can reduce the storage space of the stove 100.

Figure 16:
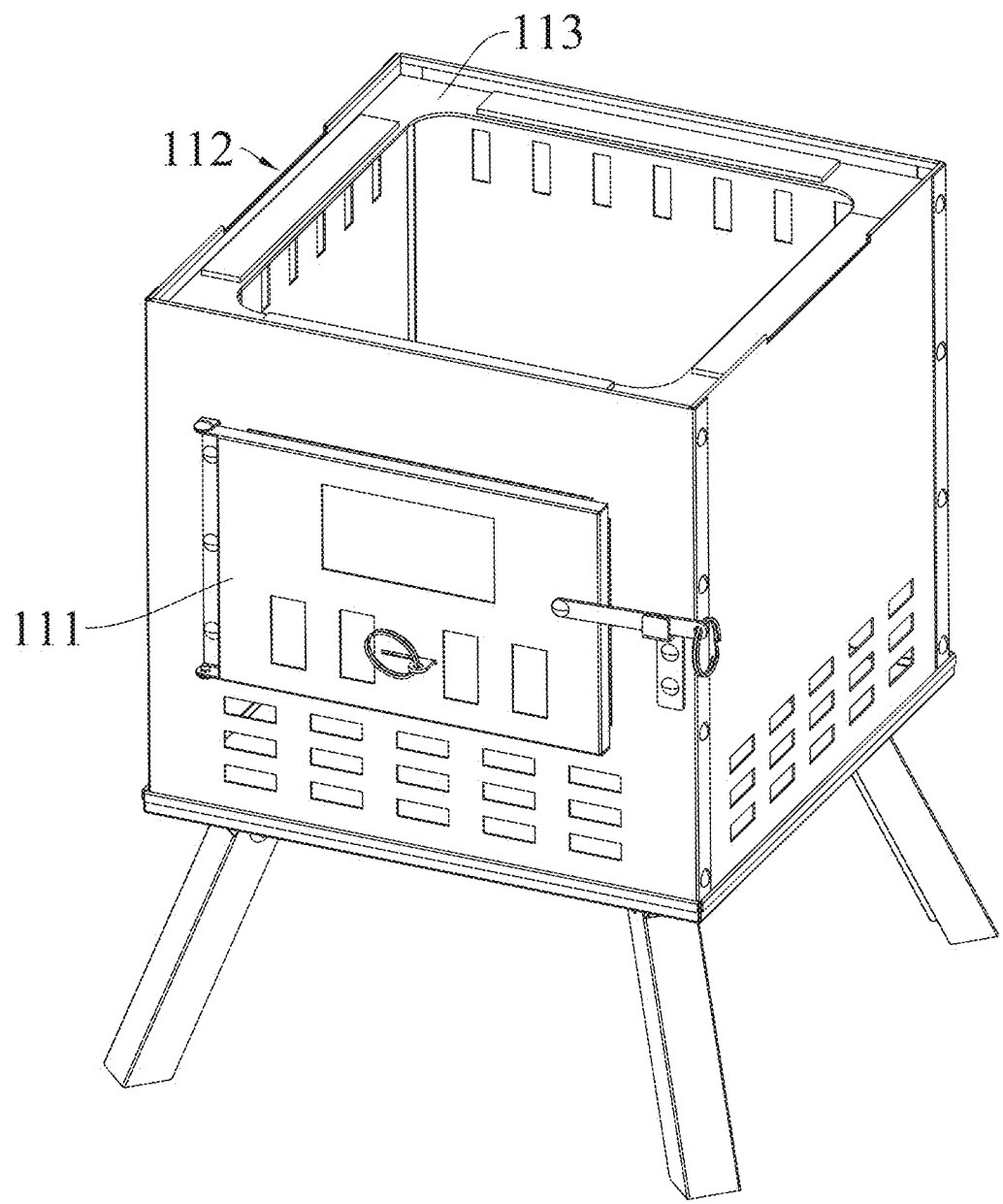
FIG. 16 is a schematic structural view of a stove with an adapter plate installed according to some embodiments of the present disclosure.
Figure 17:
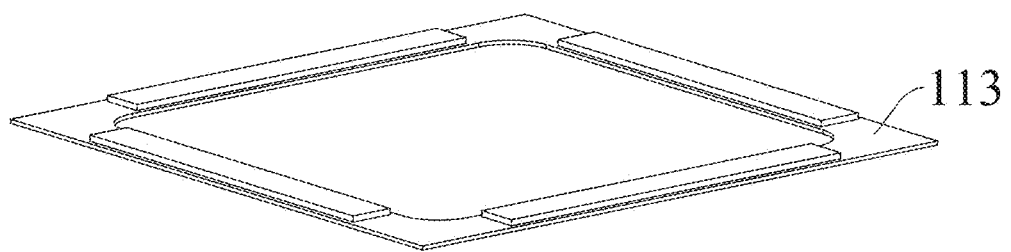
FIG. 17 is a schematic structural view of the adapter plate shown in FIG. 16.

In some embodiments, as shown in FIG. 16 and FIG. 17, an adapter plate 113 is installed on the top of the stove 100, the adapter plate 113 is a ring-shaped structure, and the grilling pan 20 or the frying pan 300 can be placed above the adapter plate 113. Taking the grilling pan 20 as an example, the grilling pan 20 is provided with multiple sizes, and the corresponding size of the grilling pan 20 can be selected for cooking different food. To allow the stove 100 to selectively adapt to more sizes of grilling pans 20, the above requirements can be achieved through the adapter plate 113. The adapter plate 113 can reduce an outlet diameter of the upper stove chamber 1011 and provide support for the grilling pan 20. In some embodiments, the top of the outer stove wall 105 encloses to form a first support structure, and the first support structure provides support for the adapter plate 113. Alternatively, the top of the inner stove wall 106 encloses to form a second support structure, and the second support structure provides support for the adapter plate 113, Alternatively, the first support structure and the second support structure jointly provide support for the adapter plate 113.

Figure 18:
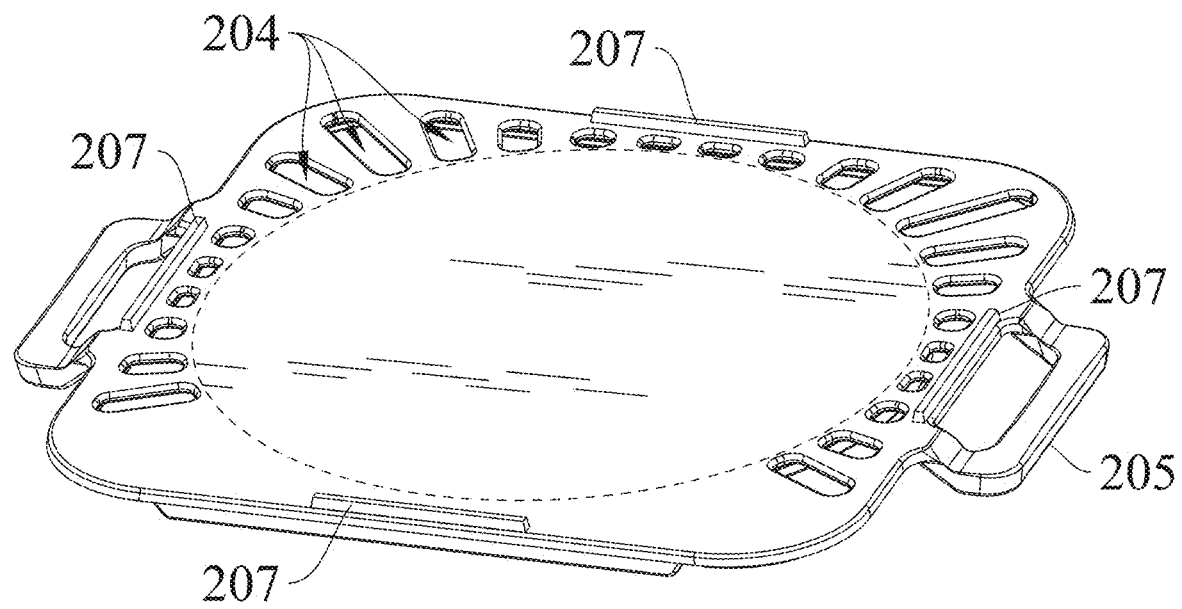
FIG. 18 is a schematic structural view of a grilling pan with bottom feet according to some embodiments of the present disclosure.

In some embodiments, as shown in FIG. 18, each of four edge of the grilling pan 20 is provided with a bottom post 207, and the four bottom posts 207 are distributed in the middle of each edge of the grilling pan 20. During the production process, the grilling pan 20 may be slightly deformed, resulting in irregular distortion of the four sides of the grilling pan 20, affecting its stability on the bearing surface. However, each bottom post 207 occupies a small area on the grilling pan 20, so the above-mentioned slight deformation has limited effect on the bottom post 207, which can improve the stability of the grilling pan 20 on the bearing surface. In addition, when the grilling pan 20 is placed on the stove 100 for cooking, the bottom post 207 of the grilling pan 20 can be mutually engaged with the stove wall of the stove 100 to limit the displacement of the grilling pan 20 on the stove 100.

In some embodiments, as shown in FIG. 16, a door 111 is provided on a side of the stove body 108, and the fuel in the stove chamber 101 can be observed through the door 111, for example, the state of fuel combustion, the remaining amount of fuel, etc. The fuel can also be added to the upper stove chamber 1011 through the door 111.

Figure 19:
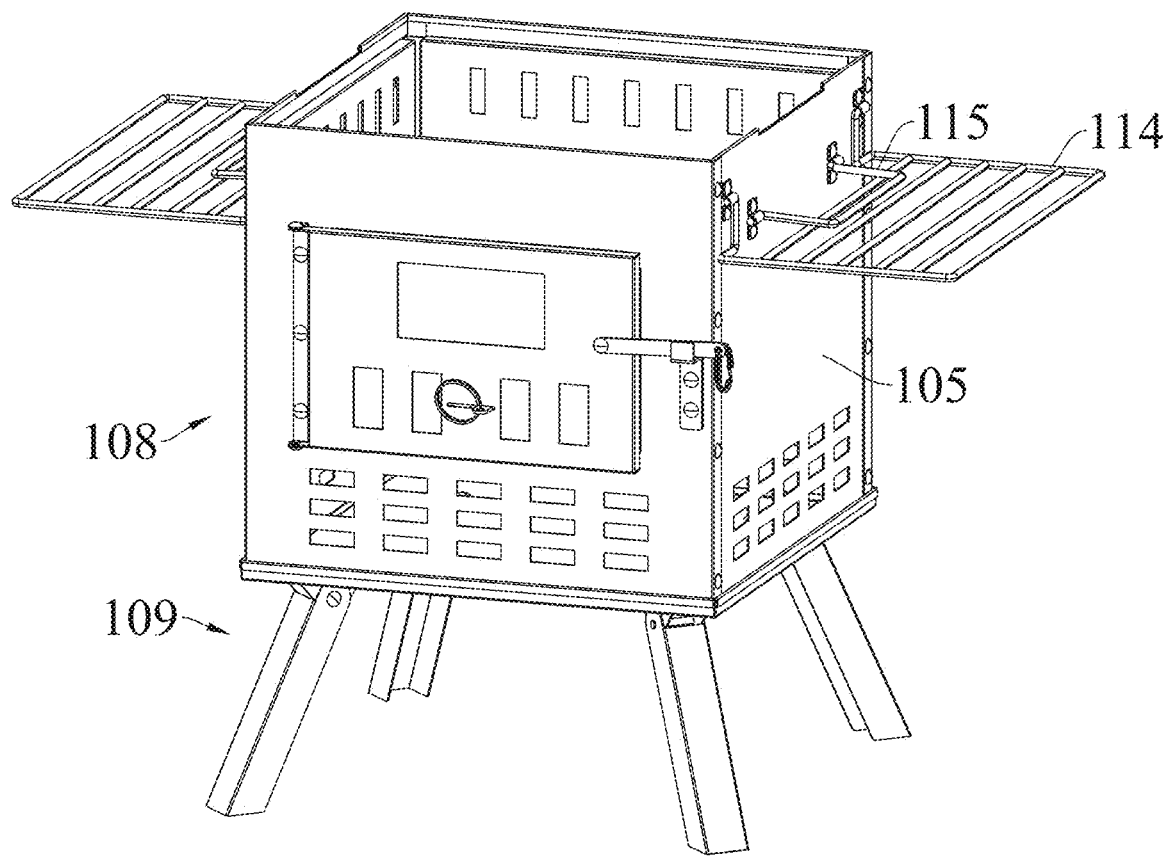
FIG. 19 is a schematic structural view of a stove with a handle and a bracket according to some embodiments of the present disclosure.

In some embodiments, as shown in FIG. 19, a handle 115 is installed on a side of the stove body 108, and the handle 115 is held to facilitate moving the stove body 108. Moreover, the temperature of the handle 115 is lower than the temperature of the side wall of the stove body 108, which is relatively safer.

In some embodiments, as shown in FIG. 19, a bracket 114 is further installed on a side of the stove body 108, and some food materials, tableware, etc. can be placed on the bracket 114.

The above description is only some embodiments of the present disclosure and is not intended to limit the present disclosure. For those of ordinary skill in the art, the present disclosure may have various modifications and variations. Any modification, equivalent replacement, improvement, etc. made within the spirit and principle of the present disclosure shall be included in the protection scope of the present disclosure.

What is claimed is:

1. A grilling assembly, comprising
a grilling pan, comprising a grilling area, an insulation area, and a heat penetration area; the insulation area and the heat penetration area forming a continuous area; and the continuous area being arranged outside the grilling area;
wherein the heat penetration area is defined with at least one through hole, the at least one through hole is configured to allow at least a portion of heat to pass through and be transferred to the grilling area, the grilling pan is provided with an annular enclosure protruded outward along an edge of the grilling area, the annular enclosure comprises a first bevel and a second bevel, the first bevel and the second bevel of the annular enclosure define a notch at an intersection of the grilling area and the insulation area, the intersection of the grilling area and the insulation area extends from a longitudinal direction of the grilling pan, an outer edge of the continuous area of the grilling pan is provided with a convex ridge protruded outward, a first portion of the convex ridge is defined with a first indentation and a second indentation facing the notch of the annular enclosure, the first portion of the convex ridge is arranged on an outer edge of the insulation area and extends from the longitudinal direction of the grilling pan; and
a frying pan, wherein the frying pan is provided with a chamber recessed inward, a concaved wall of the frying pan is defined with an opening; a distance from a first end point to a second end point of the concaved wall of the frying pan is greater than a distance between the first indentation and the second indentation; and when the frying pan and the grilling pan are in a closed position, the first indentation and the second indentation are located between the first end point and the second end point of the concaved wall of the frying pan, and an inner wall of an edge of the frying pan and an outer wall of the convex ridge are mutually engaged.

2. The grilling assembly according to claim 1, wherein the at least one through hole is distributed around the grilling area.

3. The grilling assembly according to claim 1, wherein the insulation area is devoid of the at least one through hole.

4. The grilling assembly according to claim 1, wherein the grilling pan is provided with a first handle, and the first handle is fixedly connected to the grilling pan; or/and
the grilling pan is provided with at least two bottom posts.

5. The grilling assembly according to claim 1, wherein the frying pan and the grilling pan is capable of being served as a cover for each other, and the chamber is capable of covering the grilling area and the heat penetration area.

6. The grilling assembly according to claim 1, wherein the frying pan is provided with a second handle, and the second handle is fixedly connected to the frying pan.

7. The grilling assembly according to claim 1, wherein a bottom of the chamber is provided with a plurality of protruding structures.

8. A cooking device, comprising:
a stove and a grilling assembly mounted on a top of the stove; wherein the stove comprises a stove chamber enclosed by a stove wall, wherein a grate plate is arranged in the stove chamber, and the grate plate divides the stove chamber into an upper stove chamber and a lower stove chamber;
the stove wall comprises an outer stove wall and an inner stove wall, an air passage for gas flow is defined between the outer stove wall and the inner stove wall, and a bottom of the air passage is in communication with the lower stove chamber; a lower portion of the outer stove wall is defined with an outer air inlet hole, and the outer air inlet hole is in communication with the lower stove chamber; an upper portion of the inner stove wall is provided with an inner air inlet hole, and the air passage is in communication with the upper stove chamber through the inner air inlet hole;
combustion-supporting air entering the lower stove chamber from the outer air inlet hole is divided into at least two portions, one portion of the combustion-supporting air is capable of entering the upper stove chamber through a grate hole of the grate plate; another portion of the combustion-supporting air is capable of entering the upper stove chamber through the air passage;

the grilling assembly comprises a grilling pan and a frying pan, the grilling pan comprises a grilling area, an insulation area, and a heat penetration area; the insulation area and the heat penetration area form a continuous area; and the continuous area is arranged outside the grilling area;

wherein the heat penetration area is defined with at least one through hole, the at least one through hole is configured to allow at least a portion of heat to pass through and be transferred to the grilling area, the grilling pan is provided with an annular enclosure protruded outward along an edge of the grilling area, the annular enclosure comprises a first bevel and a second bevel, the first bevel and the second bevel of the annular enclosure define a notch at an intersection of the grilling area and the insulation area, the intersection of the grilling area and the insulation area extends from a longitudinal direction of the grilling pan, an outer edge of the continuous area of the grilling pan is provided with a convex ridge protruded outward, a first portion of the convex ridge is defined with a first indentation and a second indentation facing the notch of the annular enclosure, the first portion of the convex ridge is arranged on an outer edge of the insulation area and extends from the longitudinal direction of the grilling pan; and the frying pan is provided with a chamber recessed inward, a concaved wall of the frying pan is defined with an opening; a distance from a first end point to a second end point of the concaved wall of the frying pan is greater than a distance between the first indentation and the second indentation; and when the frying pan and the grilling pan are in a closed position, the first indentation and the second indentation are located between the first end point and the second end point of the concaved wall of the frying pan, and an inner wall of an edge of the frying pan and an outer wall of the convex ridge are mutually engaged.

9. The cooking device according to claim 8, wherein the at least one through hole is distributed around the grilling area.

10. The cooking device according to claim 8, wherein the stove comprises a stove body and a base detachably connected to each other, the stove body comprises the stove wall and the stove chamber enclosed by the stove wall, the base includes a bottom plate for holding the stove body, and the stove body is capable of being selectively placed above the bottom plate.

11. The cooking device according to claim 10, wherein the bottom plate is provided with a foot capable of being folded or unfolded.

12. The cooking device according to claim 8, wherein the top of the stove is provided with an adapter plate which is a ring structure, the grilling assembly is capable of being placed above the adapter plate, and the adapter plate is configured to adapt to grilling assemblies of different sizes.

13. The cooking device according to claim 8, wherein the stove wall is further provided with a door.

14. The cooking device according to claim 8, wherein one side of the stove is provided with a handle; or/and
one side of the stove is provided with a bracket.

* * * * *